United States Patent
Kasprzak et al.

(10) Patent No.: US 7,911,817 B2
(45) Date of Patent: Mar. 22, 2011

(54) SYSTEMS AND METHODS FOR CONTROLLING ENERGY CONSUMPTION OF AC-DC ADAPTERS

(75) Inventors: Keith J. Kasprzak, Cedar Park, TX (US); Daniel B. Little, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 12/284,144

(22) Filed: Sep. 18, 2008

(65) Prior Publication Data

US 2010/0067268 A1    Mar. 18, 2010

(51) Int. Cl.
*H02M 7/02* (2006.01)
(52) U.S. Cl. ........................................ 363/146
(58) Field of Classification Search ............... 363/146; 323/349, 351; 307/126, 140
See application file for complete search history.

(56) References Cited

U.S. PATENT DOCUMENTS

| | | | |
|---|---|---|---|
| 4,926,303 A | 5/1990 | Sturgeon | |
| 5,297,015 A * | 3/1994 | Miyazaki et al. | 363/146 |
| 7,030,596 B1 | 4/2006 | Salerno et al. | |
| 7,034,513 B2 | 4/2006 | Gan et al. | |
| 7,392,410 B2 * | 6/2008 | Allen et al. | 713/310 |
| 2002/0016568 A1 | 2/2002 | Lebel et al. | |
| 2002/0019606 A1 | 2/2002 | Lebel et al. | |
| 2002/0049480 A1 | 4/2002 | Lebel et al. | |
| 2002/0058906 A1 | 5/2002 | Lebel et al. | |
| 2002/0065454 A1 | 5/2002 | Lebel et al. | |
| 2002/0065509 A1 | 5/2002 | Lebel et al. | |
| 2002/0065540 A1 | 5/2002 | Lebel et al. | |
| 2003/0055406 A1 | 3/2003 | Lebel et al. | |
| 2003/0065308 A1 | 4/2003 | Lebel et al. | |
| 2003/0065370 A1 | 4/2003 | Lebel et al. | |
| 2003/0176933 A1 | 9/2003 | Lebel et al. | |
| 2004/0030524 A1 | 2/2004 | Jarrell et al. | |
| 2004/0193090 A1 | 9/2004 | Lebel et al. | |
| 2005/0010269 A1 | 1/2005 | Lebel et al. | |
| 2005/0063865 A1 | 3/2005 | Bonne et al. | |
| 2005/0142662 A1 | 6/2005 | Bonne | |
| 2006/0173444 A1 | 8/2006 | Choy et al. | |
| 2007/0295673 A1 | 12/2007 | Enis et al. | |

OTHER PUBLICATIONS

Energy Star, "Energy Star Program Requirements For Single Voltage External Ac-Dc and Ac-Ac Power Supplies", Version 1.1, Printed From Internet Sep. 17, 2008, 6 pgs.

* cited by examiner

*Primary Examiner* — Gary L Laxton
(74) *Attorney, Agent, or Firm* — O'Keefe, Egan, Peterman & Enders LLP (57) ABSTRACT

An AC-DC adapter is provided with an auto-sensing capability to sense when no DC load is present at the output (secondary side) of the adapter by monitoring for absence of load-indicative signals, such as power supply identifier (PSID) signals communicated to the adapter from a coupled DC-powered device. Upon detection of a no load condition, the adapter enters a no load mode during which the adapter output is turned off in order to reduce energy consumption by the adapter, and only produces short recurring voltage pulses (hiccups) at the adapter output. Upon detection of load-indicative signals communicated to the adapter from a coupled DC-powered device, the adapter output enters normal mode and provides its normal regulated power value to the adapter output for powering the coupled DC-powered device.

22 Claims, 4 Drawing Sheets

SYSTEMS AND METHODS FOR CONTROLLING ENERGY CONSUMPTION OF AC-DC ADAPTERS

BACKGROUND OF THE INVENTION

1. Field of the Invention

This invention relates generally to AC-DC adapters, and more particularly to controlling energy consumption by AC-DC adapters.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

External AC-DC adapters or power supplies are commonly employed to convert alternating current (AC) wall current to direct current (DC) for powering DC-powered devices, including DC-powered information handling systems such as notebook computers. AC-DC adapters are commonly left connected to wall current power sources even when not connected to a DC-powered device or when connected to a DC-powered device that is not drawing current. Under such conditions, a typical AC-DC adapter remains on and consumes energy. To minimize wasted energy under such adapter operating conditions, current Tier 2 "ENERGY STAR" program requirements specify a maximum no load AC power consumption of less than or equal to 0.5 watts for an external power supply having a nameplate output power rating of less than 10 watts. Most conventional AC-DC power supplies meet this maximum no load AC power consumption requirement by running in a reduced frequency "burst mode." However, during such a conventional burst mode, the power supply output remains on, and the burst frequency can cause audible issues.

SUMMARY OF THE INVENTION

Disclosed herein are systems and methods for controlling energy consumption by AC-DC adapters. Using the disclosed systems and methods, no load energy consumption of an AC-DC adapter may be reduced relative to conventional adapter energy consumption under no load conditions, e.g., such as when an adapter is plugged into a wall power source but not connected to a DC-powered device, or when an adapter is plugged into a wall power source but is coupled to a DC-powered device that is not drawing current. For example, in on exemplary embodiment, an AC-DC adapter may be advantageously configured to consume about 0.25 watts less power than a conventional 0.5 watt adapter, driving total no load power consumption below about 0.25 watts.

Using the disclosed systems and methods, an AC-DC adapter may be provided with an auto-sensing capability to sense when no DC load is present at the output (secondary side) of the adapter by monitoring for absence of load-indicative signals (e.g., communication signal such as power supply identifier (PSID) signal, current indicative signal such as current level signal, etc.), communicated to the adapter from a DC-powered device. Such an absence of load-indicative signals indicates that the adapter is not connected to a DC-powered device, or that a connected DC-powered device is inactive (i.e., drawing no power). Upon detection of such a no load condition, the adapter enters a no load mode and the adapter output is turned off (i.e., $V_{OUT}$ equal to 0 volts at the adapter output) in order to reduce energy consumption by the adapter. Throughout the duration of the no load condition, the adapter output remains at 0 volts except for producing short recurring voltage pulses (hiccups) at the adapter output which are provided for purposes of powering load-indicative signal-generating circuitry (e.g., PSID circuitry) of any active DC-powered device that may become coupled to the adapter output after the adapter enters the no load mode. When so powered, such load-indicative circuitry will produce load-indicative signals that are communicated back to the adapter via the adapter power cord. Upon detection of load-indicative signals communicated to the adapter (e.g., by a connected DC-powered device such as notebook computer), the adapter output enters normal mode and provides its normal regulated output voltage to the adapter output for powering the coupled DC-powered device under normal operating conditions.

In one exemplary embodiment, an AC-DC adapter may be provided with auto-sensing capability by inclusion of an auto-sensing circuitry that is tied to the PSID communication pin of the adapter. A buffer stage may be provided in the auto-sensing circuitry so that communicated PSID signals are not substantially affected by the remainder of the auto-sensing circuitry in order to ensure that PSID communication between a DC-powered device and the adapter is unaltered. When the adapter is coupled to a DC-powered-device, a capacitor or other suitable charge-storing circuitry may be provided in the auto-sensing circuitry that is charged by PSID communication pulses communicated from the DC-powered device to the adapter. The auto-sensing circuitry may include a comparator or other circuitry suitable for detecting the presence of PSID-induced charge on the capacitor or other charge-storing circuitry, and for producing a signal indicative of the absence and/or presence of PSID-induced charge which is in turn communicated from the auto-sensing circuitry to adapter switching control circuitry, e.g., through an optocoupler or other suitable isolation circuitry. Alternatively, any other configuration of circuitry may be provided that is suitable for sensing the presence of PSID signals and providing a signal to the adapter controller that is indicative thereof. The switching control circuitry may be configured to vary the output mode of the adapter based on the nature of the signal received from the auto-sensing circuitry, e.g., so that the adapter provides normal regulated power at the adapter output when the presence of PSID signals are detected, while it provides no power at the adapter output other than short recurring voltage pulses (hiccups) in the absence of any such PSID signals.

In one respect, disclosed herein is a method for operating an AC-DC adapter. The method may include the method, including: providing an AC-DC adapter configured to convert AC power to DC power and to provide the DC power to a DC-powered device at a DC power output of the AC-DC adapter, the AC-DC adapter being further configured to receive load-indicative signals from a DC-powered device; providing AC power to an AC input of the AC-DC adapter; monitoring for the presence of load-indicative signals communicated from a DC-powered device to the AC-DC adapter while providing the AC power to the AC input of the AC-DC adapter; and controlling energy consumption of the AC-DC adapter by: operating the AC-DC adapter so as to provide a first level of DC power at the DC power output that is sufficient for powering a DC-powered device while load-indicative signals are being communicated to the AC-DC adapter from a DC powered device, and operating the AC-DC adapter so as to provide a second level of DC power at the DC power output while load-indicative signals are not being communicated to the AC-DC adapter from a DC powered device; wherein the second level of DC power is less than the first level of DC power.

In another respect, disclosed herein is an AC-DC adapter, including: AC to DC conversion circuitry configured to receive AC current and to convert the AC current to DC current; power switching circuitry coupled between the AC to DC conversion circuitry and a DC power output of the AC adapter that is configured for coupling to supply DC power to a DC-powered device, the power switching circuitry being configured to regulate DC power provided from the AC to DC conversion circuitry to the DC power output; switch control circuitry coupled to the power switching circuitry, the switch control circuitry being configured to control operation of the power switching circuitry; load-indicative signal generating circuitry configured to receive load-indicative signals from a DC-powered device; and auto-sensing circuitry coupled to the load-indicative signal generating circuitry, the auto-sensing circuitry configured to monitor for the presence of load-indicative signals communicated from a DC-powered device to the load-indicative signal generating circuitry of the AC-DC adapter. The auto-sensing circuitry may be configured to provide a signal to the switch control circuitry that is indicative of the presence of load-indicative signals communicated from a DC-powered device to the load-indicative signal generating circuitry of the AC-DC adapter; and the switch control circuitry may be configured to control energy consumption of the AC-DC adapter by: controlling the power switching circuitry so as to provide a first level of DC power at the DC power output that is sufficient for powering a DC-powered device while load-indicative signals are being communicated to the AC-DC adapter from a DC powered device, and controlling the power switching circuitry so to provide a second level of DC power at the DC power output while load-indicative signals are not being communicated to the AC-DC adapter from a DC powered device; wherein the second level of DC power is less than the first level of DC power.

In yet another respect, disclosed herein is a method of powering a DC-powered device, including: providing a DC-powered device; providing an AC-DC adapter; providing AC power to an AC input of the AC-DC adapter; coupling the AC-DC adapter to the DC-powered device to provide DC power to the DC-powered device, and to provide load-indicative signals from the DC-powered device to the AC-DC adapter; providing a first level of DC power to the DC-powered device from the AC-DC adapter, the first level of DC power being sufficient for powering the DC-powered device, including powering the generation of load-indicative signals from the DC-powered device to the AC-DC adapter; monitoring for the presence of the load-indicative signals communicated from the DC-powered device to the AC-DC adapter; and controlling energy consumption of the AC-DC adapter by: operating the AC-DC adapter so as to provide the first level of DC power to the DC-powered device as long as the load-indicative signals are being communicated to the AC-DC adapter from the DC powered device, and operating the AC-DC adapter so as to provide a second level of DC power to the DC-powered device when the load-indicative signals are no longer being communicated to the AC-DC adapter from the DC powered device; wherein the second level of DC power is less than the first level of DC power.

BRIEF DESCRIPTION OF THE DRAWINGS

FIG. 5 illustrates

DESCRIPTION OF ILLUSTRATIVE EMBODIMENTS

Figure 1:
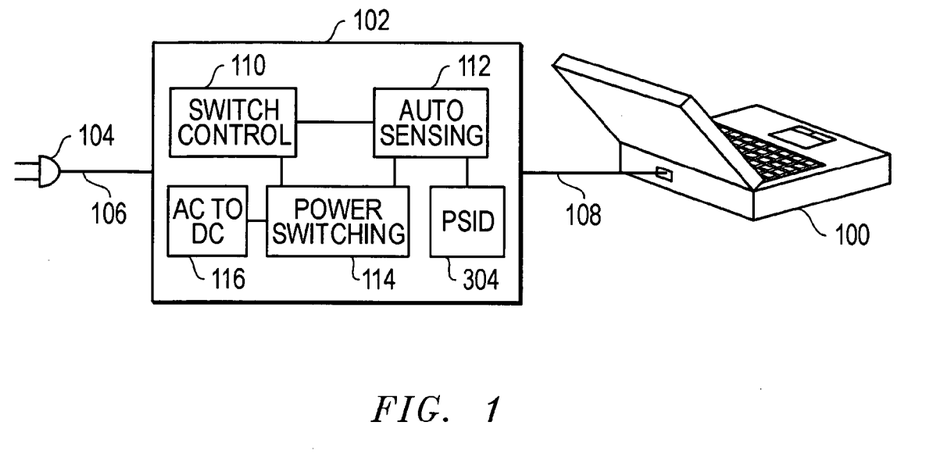
FIG. 1 is a simplified block diagram of an AC-DC adapter coupled to a DC-powered information handling system according to one exemplary embodiment of the disclosed systems and methods.

FIG. 1 illustrates a DC-powered information handling system in the form of a notebook computer 100 that is coupled by a DC power cord 108 to an AC-DC adapter 102 according to one embodiment of the disclosed systems and methods. AC-DC adapter 102 is configured to receive AC wall power via AC power cord 106 and power plug 104, to convert the provided AC power to DC power, and to provide the DC power to notebook computer 100 via DC power cord 108. Notebook computer 100 includes a system load (e.g., processor/s, display, disk drive/s, communication circuitry, one or more batteries, battery charging circuitry, etc.) that is powered by the DC power so provided by AC-DC adapter 102. Although a notebook computer 100 is illustrated, it will be understood that the disclosed systems and methods may be implemented with any other type of information handling system or other device having a system load that is DC powered.

Figure 2:
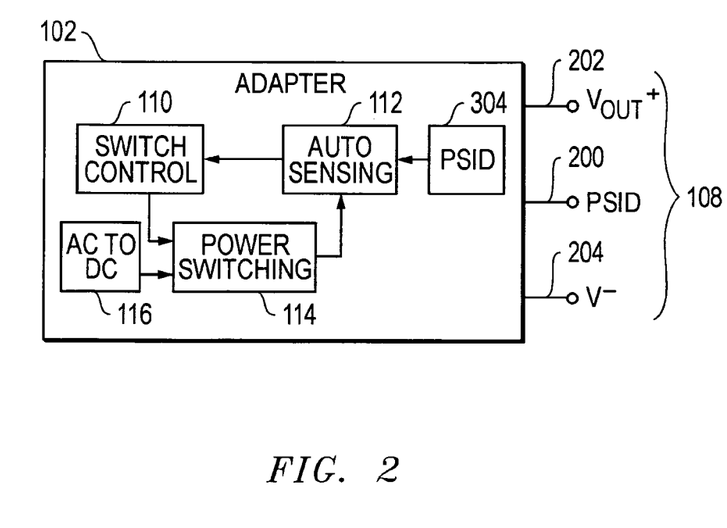
FIG. 2 is a simplified block diagram of an AC-DC adapter according to one exemplary embodiment of the disclosed systems and methods.

As shown in FIG. 2, AC-DC adapter 102 includes switch control circuitry 110, such as pulse width modulation (PWM) integrated circuitry or other suitable control circuitry. Also shown in FIG. 2 are respective $V_{OUT}^+$, $V^-$ and PSID pins 202, 204 and 200 of adapter 102, which couple to corresponding individual respective conductors of power DC power cord 108. AC-DC adapter 1-02 also includes power switching circuitry 114 that is coupled between AC to DC conversion circuitry 116 (e.g., AC to DC transformer) and $V_{OUT}^+$ and $V^-$ pins 202 and 204 of adapter 102. Power switching circuitry 114 may include any type of switch circuitry (e.g., such as metal oxide semiconductor field-effect transistor (MOSFET) switches) that is suitable for regulating supply of DC current from the adapter DC current source to pins 202 and 204 of adapter 102. Further information on PSID functionality may be found, for example, in U.S. Pat. No. 7,392,410, which is incorporated herein by reference in its entirety.

Still referring to FIG. 2, switch control circuitry 110 controls DC current output by adapter 102 via pins 202 and 204 through corresponding conductors of power cord 108 to notebook computer 100 by controlling power switching circuitry 114 between ON and OFF states to produce a continuous level of non-zero voltage. For example, switch control circuitry 110 may control power switching circuitry 114 to allow a continuous flow of DC current to pins 202 and 204 in an ON state, or may regulate DC current output to pins 202 and 204 by controlling power switching circuitry 114 between ON and OFF states to control duty cycle (i.e., frequency and/or pulse length) of power output by adapter 102 to notebook computer 100.

Also shown in FIG. 2 is auto-sensing circuitry 112 that is configured to sense when no DC load is present at the $V_{OUT}^+$ and $V^-$ pins 202 and 204 of adapter 102 by monitoring for absence of PSID signals communicated from notebook computer 100 to PSID circuitry 304 of adapter 102 through PSID pin 200, e.g., such as when adapter 102 is not coupled to supply power to notebook computer 100, or when adapter 102 is coupled to notebook computer 100 but notebook computer 100 is inactive. Upon detection of such a no load condition, auto-sensing circuitry 112 instructs switch control circuitry 110 to enter a no load mode, which in turn controls power switching circuitry 114 so as to turn-off power output from adapter 102 to notebook computer 100 via pins 202 and 204 in a manner that reduces energy consumption by adapter 102.

In this exemplary embodiment, PSID communication signals and circuitry have been described and illustrated. However, it will be understood that the disclosed systems and methods may be implemented by monitoring any other type of load-indicative signal/s that are transmitted between communication circuitry of a DC-powered device and corresponding communication circuitry of an AC-DC adapter only when a load of the DC-powered device is coupled and ready to receive power from the AC-DC adapter. For example, in an alternative embodiment, a load-indicative signal may be a current-indicative signal (e.g., generated by a current transformer or shunt circuitry of a motherboard of the DC-powered device) that is representative of current level drawn by circuitry of the DC-powered device.

Throughout the duration of a no load condition, switch control circuitry 110 controls power switching circuitry 114 to produce short recurring voltage pulses (hiccups) separated by intervals of no voltage at the adapter $V_{OUT}^+$ and $V^-$ output pins 202 and 204. These short voltage pulses are of momentary duration (e.g., duration of about 100 microseconds every 3 seconds), and are provided for purposes of powering PSID circuitry of notebook computer 100 when the circuitry of notebook computer 100 is activated and coupled to adapter 102 via power cord 108. When so powered, PSID circuitry of activated notebook computer 100 will produce PSID signals (e.g., at system voltage of about 3.3 volts) that are communicated back to the adapter via PSID pin 200 from power cord 108. Upon detection of such PSID signals communicated back to the adapter 102, auto-sensing circuitry 112 instructs switching control circuitry 110 to enter normal power mode. In response, switching control circuitry 110 controls power switching circuitry 114 to provide normal regulated power value to adapter $V_{OUT}^+$ and $V^-$ output pins 202 and 204 for powering notebook computer 100.

In one exemplary embodiment where a power good indicator (e.g., PGOOD LED) is present and coupled to $V_{OUT}$ of AC-DC adapter, an optional zener diode may be added in series with the power indicator to eliminate the blinking of the power indicator during the no-load mode. In such an embodiment, the cathode and anode of the zener diode may be disposed in opposite direction of the power indicator in order to force the adapter $V_{OUT}$ to exceed a certain threshold before back-biasing the zener diode to turn on the power indicator. An optional delay capacitor may also be added to ensure that pulses on adapter $V_{OUT}$ do not charge the delay capacitor sufficiently to back bias the zener diode.

Figure 3:
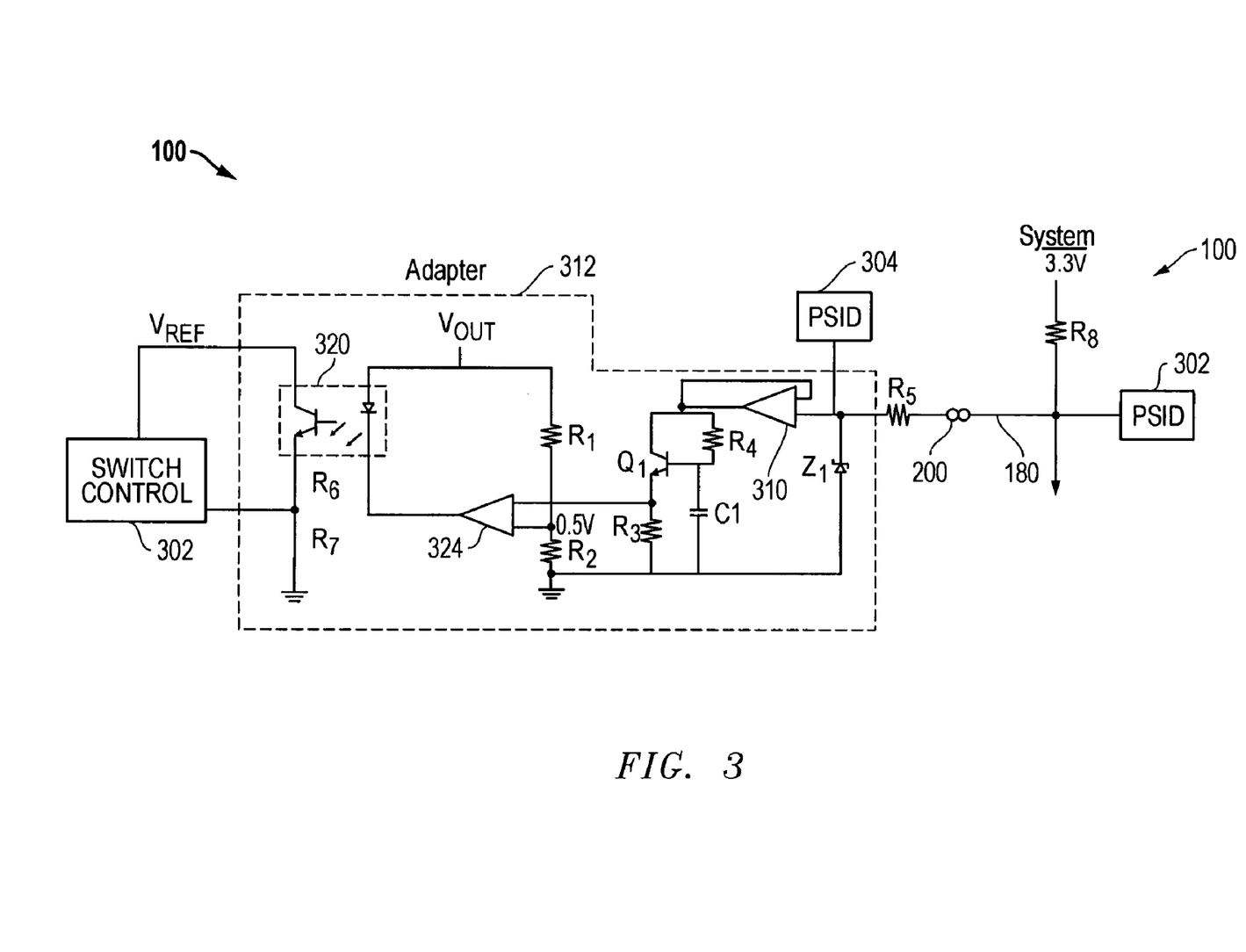
FIG. 3 is a simplified partial schematic of AC-DC adapter-side circuitry according to one exemplary embodiment of the disclosed systems and methods.

FIG. 3 illustrates a simplified partial schematic of one exemplary embodiment of adapter-side circuitry of AC-DC adapter 102 as it may be coupled to system side circuitry of notebook computer 100 by PSID pin 200 and corresponding PSID conductor of power cord 108. As shown, notebook computer 100 includes system side PSID circuitry 302 that exchanges communication pulses with adapter side PSID circuitry 322 via PSID pin 200 and PSID conductor of power cord 108. Information that may be communicated using PSID communication pulses includes, for example, type of AC-DC adapter, wattage of AC-DC adapter, date code, manufacturing site, vendor name, etc. As further shown, system side PSID circuitry 302 receives system power (e.g., 3.3 volts) across resistor R8 when notebook computer 100 is active (e.g., power on) and coupled to receive power from AC-DC adapter 102 across power cord 108.

Still referring to FIG. 3, adapter side PSID circuitry is coupled to receive PSID communication signals from PSID pin 200 via resistor R5. Auto-sensing circuitry 112 is also coupled to PSID pin 200 to receive PSID communication signals as shown. In this exemplary embodiment, auto-sensing circuitry 112 includes buffer circuitry components that may be present to ensure that PSID communications between AC-DC adapter 102 and notebook computer 100 are not altered by operation of auto-sensing circuitry 112. The illustrated buffer circuitry components include buffer 310, resistor R4 and transistor Q1. However, any other buffer circuitry component configuration may be employed that is suitable for ensuring that the PSID signals communicated between PSID circuitry 302 and 304 are not substantially affected by the remainder of auto-sensing circuitry.

Figure 4:
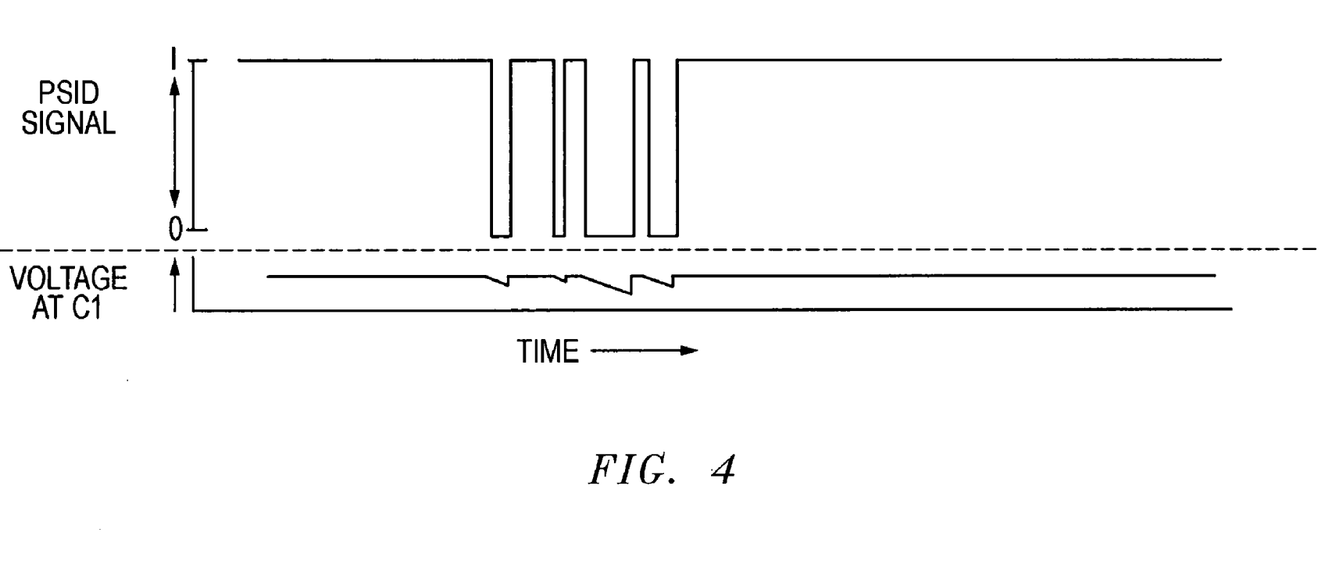
FIG. 4 illustrates PSID signals and capacitor voltage as a function of time according to one exemplary embodiment of the disclosed systems and methods.

As shown, auto-sensing circuitry 112 also includes PSID charge storage circuitry in the form of capacitor C1 that is charged through buffer 310 and resistor R4 of the buffer circuitry by pulsed PSID communication signals from notebook computer 100 to adapter when adapter 102 is coupled to notebook computer 100. In this exemplary embodiment, capacitance of capacitor C1 is chosen so that charge on capacitor C1 will ride through the short pulsed PSID communication signals received at PSID pin 200 from notebook computer 100. This is illustrated in FIG. 4 where voltage on capacitor C1 remains substantially constant over time during PSID communication pulses received from notebook computer 100.

Still referring to FIG. 3, a zener diode Z1 may be provided as shown for clamping stray voltage spikes to a safe level for PSID circuitry 304. Auto-sensing circuitry 112 is further provided with a comparator 324 having a first input that is coupled at a first node between transistor Q1 and resistor R3 and having a second input that is coupled at a second node between resistors, R1 and R2 as shown. The output of comparator 324 is coupled to optocoupler 320 that couples auto-sensing circuitry 112 to switch control circuitry 110 in an isolated manner as shown. It will be understood that any other suitable form of isolation circuitry may alternatively be employed that is suitable for forming an isolation barrier across which signals from comparator 324 may be communicated to switch control circuitry 110, e.g., capacitive isolation circuitry, etc.

In the embodiment of FIG. 3, the voltage at the first node (between transistor Q1 and resistor R3) is reflective of the presence or absence of charge on capacitor C1, while the voltage at the second node (between resistors R1 and R2) is an internal voltage reference of AC-DC adapter 102 that is determined by magnitude of adapter $V_{OUT}$ and resistor R1 and R2. Thus, as long as charge is maintained on capacitor C1 due to pulsed PSFD communication signals from notebook computer 100 to adapter 102, output of comparator 324 remains high and the LED of optocoupler 320 remains off. Switch control circuitry 110 (e.g., PWM IC) operates normally while optocoupler 320 is off and power output of AC-DC adapter 102 remains on.

Figure 5:
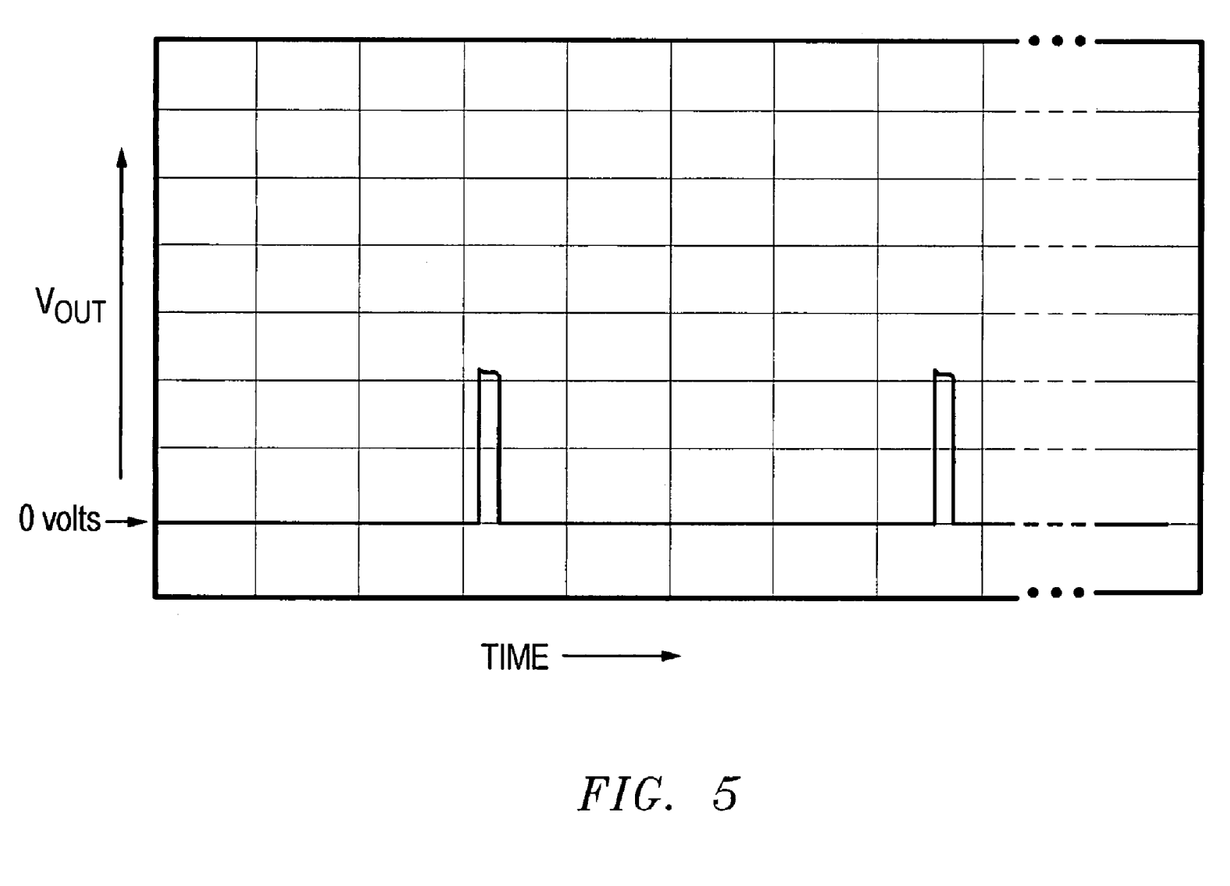
FIG. 5 illustrates adapter output voltage a function of time according to one exemplary embodiment of the disclosed systems and methods.

However, once adapter 102 is removed (e.g., decoupled) from notebook computer 100 (or notebook computer 100 is otherwise deactivated), PSID circuitry 302 of notebook computer loses system power and ceases to produce PSID communication signal pulses. In this case, the accumulated charge on capacitor C1 leaks off and the output of comparator 324 is driven low. Optocoupler 320 responds to the low output of comparator 324 by turning on, which in turn drives switch control circuitry 110 into no-load mode. During no-load mode, switch control circuitry 110 controls power switching circuitry 114 so that it produces no power, but only short recurring voltage pulses (hiccups) at the adapter $V_{OUT}^+$ and V⁻ output pins 202 and 204. FIG. 5 illustrates one exemplary embodiment of $V_{OUT}$ as a function of time during no-load mode.

AC-DC adapter 102 will remain in no-load mode until it is removed (e.g., unplugged) from the AC wall power source (in which case the adapter circuitry turns off), or until the adapter 102 is again coupled to notebook computer 100 by power cord 108. When adapter 102 is again coupled to activated notebook computer 100, the short recurring voltage pulses (hiccups) produced at the adapter $V_{OUT}^+$ and V⁻ output pins 202 and 204 are provided across power cord 108 to circuitry of notebook computer 100, including PSID circuitry 302. PSID circuitry 302 responds by again communicating pulsed PSID communication signals to PSID circuitry 304 and auto-sensing circuitry 112 of adapter 102. Capacitor C1 of auto-sensing circuit 112 is charge again by the PSID signal pulses, causing comparator output 324 once again to go high and optocoupler 320 to accordingly turn off. In response to optocoupler 320 going off, switch control circuitry 110 controls power switching circuitry 114 to again produce normal regulated power at the adapter $V_{OUT}^+$ and V⁻ output pins 202 and 204. Switch control circuitry 110 will continue to control power switching circuitry 114 to produce normal regulated power at the adapter $V_{OUT}^+$ and V⁻ output pins 202 and 204 as long as adapter 102 remains coupled to activated notebook computer 100 by power cord 108, and as long as adapter 102 remains coupled to the AD wall power source.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for operating an AC-DC adapter, said method comprising:
    providing the AC-DC adapter, said AC-DC adapter being configured to convert AC power to DC power and to provide said DC power to a DC-powered device at a DC power output of said AC-DC adapter, said AC-DC adapter being further configured to receive load-indicative signals from the DC-powered device;
    providing AC power to an AC input of said AC-DC adapter;
    monitoring for the presence of load-indicative signals communicated from the DC-powered device to said AC-DC adapter while providing said AC power to said AC input of said AC-DC adapter; and
    controlling energy consumption of said AC-DC adapter by:
        operating said AC-DC adapter so as to provide a first level of DC power at said DC power output that is sufficient for powering the DC-powered device while load-indicative signals are being communicated to said AC-DC adapter from the DC powered device,
        operating said AC-DC adapter so as to provide a second level of DC power at said DC power output while load-indicative signals are not being communicated to said AC-DC adapter from the DC powered device, and
        operating said AC-DC adapter so as to provide said second level of DC power by producing recurring voltage pulses separated by intervals of no voltage at said DC power output of said adapter while load-indicative signals are not being communicated to said AC-DC adapter from the DC powered device;
    wherein said second level of DC power is less than said first level of DC power.

2. The method of claim 1, wherein said load-indicative signals are power supply identifier (PSID) signals.

3. The method of claim 1, further comprising operating said AC-DC adapter so as to provide said first level of DC power by producing a continuous level of non-zero voltage at said DC power output of said adapter while load-indicative signals are being communicated to said AC-DC adapter from the DC powered device.

4. A method for operating an AC-DC adapter, said method comprising:
    providing the AC-DC adapter, said AC-DC adapter being configured to convert AC power to DC power and to provide said DC power to a DC-powered device at a DC power output of said AC-DC adapter, said AC-DC adapter being further configured to receive load-indicative signals from the DC-powered device;
    providing AC power to an AC input of said AC-DC adapter;
    monitoring for the presence of load-indicative signals communicated from the DC-powered device to said AC-DC adapter while providing said AC power to said AC input of said AC-DC adapter; and controlling energy consumption of said AC-DC adapter by:
operating said AC-DC adapter so as to provide a first level of DC power at said DC power output that is sufficient for powering the DC-powered device while load-indicative signals are being communicated to said AC-DC adapter from the DC powered device, and operating said AC-DC adapter so as to provide a second level of DC power at said DC power output while load-indicative signals are not being communicated to said AC-DC adapter from the DC powered device;

wherein said second level of DC power is less than said first level of DC power; and wherein said monitoring for the presence of load-indicative signals communicated from the DC-powered device to said AC-DC adapter comprises storing charge produced by said load-indicative signals communicated to said AC-DC adapter from the DC powered device; and monitoring for the presence of said stored charge.

5. The method of claim 4, wherein said monitoring for the presence of load-indicative signals communicated from the DC-powered device to said AC-DC adapter further comprises comparing a voltage of said stored charge to an internal voltage reference of said AC-DC adapter.

6. The method of claim 4, further comprising isolating load-indicative signals communicated from the DC-powered device to said AC-DC adapter from said stored charge such that said communicated load-indicative signals are not substantially affected by said storage of said charge produced by said communicated load-indicative signals.

7. The method of claim 4, wherein said load-indicative signals are power supply identifier (PSID) signals.

8. An AC-DC adapter, comprising:
AC to DC conversion circuitry configured to receive AC current and to convert said AC current to DC current;
power switching circuitry coupled between said AC to DC conversion circuitry and a DC power output of said AC adapter that is configured for coupling to supply DC power to a DC-powered device, said power switching circuitry being configured to regulate DC power provided from said AC to DC conversion circuitry to said DC power output;
switch control circuitry coupled to said power switching circuitry, said switch control circuitry being configured to control operation of said power switching circuitry;
load-indicative signal generating circuitry configured to receive load-indicative signals from the DC-powered device; and
auto-sensing circuitry coupled to said load-indicative signal generating circuitry, said auto-sensing circuitry configured to monitor for the presence of load-indicative signals communicated from the DC-powered device to said load-indicative signal generating circuitry of said AC-DC adapter;
wherein said auto-sensing circuitry is configured to provide a signal to said switch control circuitry that is indicative of the presence of load-indicative signals communicated from the DC-powered device to said load-indicative signal generating circuitry of said AC-DC adapter;
wherein said switch control circuitry is configured to control energy consumption of said AC-DC adapter by:
controlling said power switching circuitry so as to provide a first level of DC power at said DC power output that is sufficient for powering the DC-powered device while load-indicative signals are being communicated to said AC-DC adapter from the DC powered device, controlling said power switching circuitry so to provide a second level of DC power at said DC power output while load-indicative signals are not being communicated to said AC-DC adapter from the DC powered device, and controlling said power switching circuitry so as to provide said second level of DC power by producing recurring voltage pulses separated by intervals of no voltage at said DC power output of said adapter while load-indicative signals are not being communicated to said AC-DC adapter from the DC powered device; and wherein said second level of DC power is less than said first level of DC power.

9. The AC-DC adapter of claim 8, wherein said load-indicative signals are power supply identifier (PSID) signals.

10. The AC-DC adapter of claim 8, wherein said switch control circuitry is configured to control said power switching circuitry so as to provide said first level of DC power by producing a continuous level of non-zero voltage at said DC power output of said adapter while load-indicative signals are being communicated to said AC-DC adapter from the DC powered device.

11. An AC-DC adapter, comprising:
AC to DC conversion circuitry configured to receive AC current and to convert said AC current to DC current;
power switching circuitry coupled between said AC to DC conversion circuitry and a DC power output of said AC adapter that is configured for coupling to supply DC power to a DC-powered device, said power switching circuitry being configured to regulate DC power provided from said AC to DC conversion circuitry to said DC power output;
switch control circuitry coupled to said power switching circuitry, said switch control circuitry being configured to control operation of said power switching circuitry;
load-indicative signal generating circuitry configured to receive load-indicative signals from the DC-powered device; and
auto-sensing circuitry coupled to said load-indicative signal generating circuitry, said auto-sensing circuitry configured to monitor for the presence of load-indicative signals communicated from the DC-powered device to said load-indicative signal generating circuitry of said AC-DC adapter;
wherein said auto-sensing circuitry is configured to provide a signal to said switch control circuitry that is indicative of the presence of load-indicative signals communicated from the DC-powered device to said load-indicative signal generating circuitry of said AC-DC adapter; and
wherein said switch control circuitry is configured to control energy consumption of said AC-DC adapter by:
controlling said power switching circuitry so as to provide a first level of DC power at said DC power output that is sufficient for powering the DC-powered device while load-indicative signals are being communicated to said AC-DC adapter from the DC powered device, and controlling said power switching circuitry so to provide a second level of DC power at said DC power output while load-indicative signals are not being communicated to said AC-DC adapter from the DC powered device;

wherein said second level of DC power is less than said first level of DC power; and wherein said auto-sensing circuitry is further configured to monitor for the presence of load-indicative signals communicated from the DC-powered device to said AC-DC adapter by storing charge produced by said load-indicative signals communicated to said AC-DC adapter from the DC powered device, and monitoring for the presence of said stored charge.

12. The AC-DC adapter of claim 11, wherein said auto-sensing circuitry is further configured to monitor for the presence of load-indicative signals communicated from the DC-powered device to said AC-DC adapter by comparing a voltage of said stored charge to an internal voltage reference of said AC-DC adapter.

13. The AC-DC adapter of claim 11, further comprising buffer circuitry configured to isolate load-indicative signals communicated from the DC-powered device to said AC-DC adapter from said stored charge such that said communicated load-indicative signals are not substantially affected by said storage of said charge produced by said communicated load-indicative signals.

14. The AC-DC adapter of claim 11, wherein said load-indicative signals are power supply identifier (PSID) signals.

15. A method of powering a DC-powered device, comprising:
providing the DC-powered device;
providing an AC-DC adapter;
providing AC power to an AC input of said AC-DC adapter;
coupling said AC-DC adapter to said DC-powered device to provide DC power to said DC-powered device, and to provide load-indicative signals from said DC-powered device to said AC-DC adapter;
providing a first level of DC power to said DC-powered device from said AC-DC adapter, said first level of DC power being sufficient for powering said DC-powered device, including powering the generation of load-indicative signals from said DC-powered device to said AC-DC adapter;
monitoring for the presence of said load-indicative signals communicated from said DC-powered device to said AC-DC adapter; and
controlling energy consumption of said AC-DC adapter by:
operating said AC-DC adapter so as to provide said first level of DC power to said DC-powered device as long as said load-indicative signals are being communicated to said AC-DC adapter from said DC powered device,
operating said AC-DC adapter so as to provide a second level of DC power to said DC-powered device when said load-indicative signals are no longer being communicated to said AC-DC adapter from said DC powered device, and
operating said AC-DC adapter to provide said second level of DC power to said DC-powered device by producing recurring voltage pulses separated by intervals of no voltage when said load-indicative signals are no longer being communicated to said AC-DC adapter from said DC powered device;
wherein said second level of DC power is less than said first level of DC power.

16. The method of claim 15, wherein said load-indicative signals are power supply identifier (PSID) signals.

17. The method of claim 15, further comprising operating said AC-DC adapter to provide said second level of DC power to said DC-powered device by producing a continuous level of non-zero voltage at said DC power output of said adapter as long as said load-indicative signals are being communicated to said AC-DC adapter from said DC powered device.

18. The method of claim 15, wherein said DC-powered device comprises a portable information handling system.

19. A method of powering a DC-powered device, comprising:
providing the DC-powered device;
providing an AC-DC adapter;
providing AC power to an AC input of said AC-DC adapter;
coupling said AC-DC adapter to said DC-powered device to provide DC power to said DC-powered device, and to provide load-indicative signals from said DC-powered device to said AC-DC adapter;
providing a first level of DC power to said DC-powered device from said AC-DC adapter, said first level of DC power being sufficient for powering said DC-powered device, including powering the generation of load-indicative signals from said DC-powered device to said AC-DC adapter;
monitoring for the presence of said load-indicative signals communicated from said DC-powered device to said AC-DC adapter; and
controlling energy consumption of said AC-DC adapter by:
operating said AC-DC adapter so as to provide said first level of DC power to said DC-powered device as long as said load-indicative signals are being communicated to said AC-DC adapter from said DC powered device, and
operating said AC-DC adapter so as to provide a second level of DC power to said DC-powered device when said load-indicative signals are no longer being communicated to said AC-DC adapter from said DC powered device;
wherein said second level of DC power is less than said first level of DC power; and
wherein said monitoring for the presence of load-indicative signals communicated from said DC-powered device to said AC-DC adapter comprises storing charge produced by said load-indicative signals communicated to said AC-DC adapter from said DC powered device; and monitoring for the presence of said stored charge.

20. The method of claim 19, wherein said monitoring for the presence of load-indicative signals communicated from said DC-powered device to said AC-DC adapter further comprises comparing a voltage of said stored charge to an internal voltage reference of said AC-DC adapter.

21. The method of claim 19, further comprising isolating load-indicative signals communicated from said DC-powered device to said AC-DC adapter from said stored charge such that said communicated load-indicative signals are not substantially affected by said storage of said charge produced by said communicated load-indicative signals.

22. The method of claim 19, wherein said DC-powered device comprises a portable information handling system.

* * * * *